United States Patent [19]

Hochradel et al.

[11] 4,058,274
[45] Nov. 15, 1977

[54] PNEUMATIC TUBE SYSTEM

[76] Inventors: Ernest Hochradel, 61 Edison Terrace, Sparta, N.J. 07871; Werner Hauer, 381 Passaic Ave., Nutley, N.J. 07110; Martin R. Meyer, 75 Voorhis Place, Ringwood, N.J. 07456; Frederick A. Reuter, 398 Marycrest Drive, Cincinnati, Ohio 45237

[21] Appl. No.: 725,850

[22] Filed: Sept. 23, 1976

[51] Int. Cl.$^2$ ............................................. B65G 51/32
[52] U.S. Cl. .......................................... 243/5; 243/2; 243/19
[58] Field of Search .......................... 243/1, 2, 5, 7–12, 243/16 R, 17–21, 23, 24, 25, 28, 31, 38; 104/138 R, 155

[56] References Cited

U.S. PATENT DOCUMENTS

| | | | |
|---|---|---|---|
| 3,227,396 | 1/1966 | Joy | 243/16 R |
| 3,232,559 | 2/1966 | Grosswiller et al. | 243/2 |
| 3,711,038 | 1/1973 | Van Otteren | 243/19 X |
| 3,778,006 | 12/1973 | Martin | 243/19 |

FOREIGN PATENT DOCUMENTS 2,337,369  2/1975  Germany .............................. 243/31

Primary Examiner—John J. Love
Assistant Examiner—James L. Rowland

[57] ABSTRACT

Different embodiments of multiple branch systems in which each branch includes multiple stations, a carrier reversing tube closed at one end, and a diverter having separate ports individually connected to (a) a branch tube which facilitates carrier transfer to and from the branch, (b) station tubes respectively associated with the different stations of the branch, and (c) the carrier reversing tube. The branch diverters selectively complete carrier-conveying paths between (a) the stations of their respective branches or their respective branch tubes and (b) their respective carrier reversing tube. Each branch has a single air supply connected to its carrier reversing tube to alternatively and selectively transfer carriers between stations of the branch via the station tubes, diverter and carrier reversing section, as well as transfer carriers to and from the branch via the branch tube.

The multi-branch system, in one form, includes a further diverter and associated carrier reversing tube which selectively interconnects a pair of branch tubes respectively associated with a carrier sending and a carrier receiving branch. Inter-branch transfer is effected by utilizing the air supply of the sending branch in the pressure mode to push the carrier into the carrier reversing tube of the inter-branch transfer network via the sending branch tube and network diverter, and utilizing the air supply of the receiving branch in its vacuum mode to pull the carrier from the network carrier reversing tube to the receiving station via the network diverter and receiving branch tube.

6 Claims, 7 Drawing Figures

Fig. 6

PNEUMATIC TUBE SYSTEM

This invention relates to pneumatic tube systems, and more particularly to systems of the type having multiple branches, each with multiple stations, which are capable of both inter-branch transfers and simultaneous intra-branch transfers.

System simplification, for the purpose of minimizing both initial cost and maintenance, is a paramount consideration in the design of a pneumatic tube system, particularly if it is to be competitive. Accordingly, an objective of this invention has been to design a simple and economical multi-branch system which is capable of carrier transfer from one station in a multi-branch station to another station in a multi-station branch, as well as simultaneous intra-branch transfers of carriers in branches not involved in an inter-branch transfer.

The foregoing objective has been accomplished in accordance with one preferred embodiment of the invention by providing each multi-station branch of a plural branch system with a diverter and interconnected carrier reversing tube which has associated with it a vacuum/pressure air supply. The diverter is operative to selectively interconnect the carrier reversing tube of the branch with the stations of the branch via their respectively associated station tubes, as well as interconnect the carrier reversing tube with a branch tube through which carriers pass in both directions to facilitate entering and leaving the branch. In addition, the system includes an additional inter-branch diverter which selectively interconnects an associated carrier reversing tube to any of the branch tubes of the various branches.

An intra-branch transfer is accomplished by interconnecting the branch carrier reversing tube to the station tube of the sending station, and applying vacuum to the branch carrier reversing tube to pull the carrier from the sending station into the branch carrier reversing tube via the station tube associated with the sending station and the branch diverter. The branch diverter is then switched to interconnect the branch carrier reversing section in which the carrier is stored to the station tube of the receiving station, whereupon the branch air supply of the sending station is placed in its pressure mode to push the carrier out of the branch carrier reversing section through the branch diverter to the receiving station via that station's respectively associated station tube. Since each branch has its own diverter, carrier reversing tube and vacuum/pressure air supply associated therewith, inter-branch transfers can occur at the different branches simultaneously.

To effect an inter-branch transfer the carrier is pulled by the sending branch air supply into the sending branch carrier reversing tube via the sending branch diverter and the associated station tube of the sending station. The sending branch diverter is then switched to interconnect the sending branch carrier reversing tube to the carrier reversing tube of the inter-branch diverter. Once this has been done the sending branch air supply is placed in the pressure mode to push the carrier from the sending branch carrier reversing tube through the sending branch diverter and branch tube into the carrier reversing section of the inter-branch diverter via the inter-branch diverter. Once this has been done the inter-branch diverter is switched to connect the carrier reversing tube of the inter-branch diverter to the receiving branch tube. The air supply of the receiving branch is then placed in its vacuum mode and a carrier is pulled from the carrier reversing tube of the inter-branch diverter through this diverter into the branch tube of the receiving station and thence through the receiving station diverter into the carrier reversing tube of the receiving branch. The air supply is then placed in the pressure mode and the carrier pushed through the diverter of the receiving branch into the station tube of the receiving branch to the receiving station.

Noteworthy of this embodiment is the fact that the inter-branch diverter is completely passive, i.e., it does not include an air supply. Also, and as noted previously, simultaneous inter-branch transfers are possible.

If desired, two carrier reversing tube sections can be connected to the inter-branch diverter. In this way, by placing the air supplies of two branches in the pressure mode, carriers can be simultaneously transferred from two branches into different carrier receiving tubes of the inter-branch diverter, thereby reducing the time necessary to effect two inter-branch carrier transfers.

In accordance with a further embodiment of the invention which also has plural multi-station branches, each with its own diverter, air supply, carrier reversing tube, and branch tube through which carriers enter and exit the branch, inter-branch transfers are effected through a closed loop transfer network. Specifically, the closed loop interbranch transfer network includes a plurality of diverters associated with different ones of the branches which are interconnected in a continuous loop by loop tube section. Each of the branch-associated loop diverters is also connected to an associated carrier reversing tube and the branch tube of its associated branch.

Intra-branch carrier transfers are effected in the manner described previously in connection with the foregoing embodiment. Simultaneous intra-branch transfers are possible, and for the reasons previously described, namely, each branch having its own diverter, carrier reversing tube, and air supply.

Inter-branch transfers are effected in the branch/loop embodiment by first drawing from the sending station to the carrier reversing tube of the sending branch, using the sending branch air supply in the vacuum mode, the carrier which is to be sent. The carrier is pushed, by placing the sending branch air supply in the pressure mode, through the sending branch diverter and sending branch tube into the associated loop diverter to the carrier reversing tube associated with that loop diverter. The carrier is then drawn to the carrier reversing tube of the receiving branch by placing the receiving branch air supply in the vacuum mode. Specifically, the carrier is drawn from the carrier reversing tube associated with the loop diverter of the sending branch through one or more sections of the loop and interposed loop diverters into the carrier reversing tube of the receiving branch via the loop diverter and branch tube associated with the receiving branch.

As long as two different inter-branch transfers do not require utilization of the same loop tube section, simultaneous inter-branch transfers are possible inasmuch as the carriers being transferred, while being in the loop simultaneously, occupy different loop sections and pass through different diverters. It is also possible to simultaneously have an inter-branch transfer and an inter-branch transfer between any two branches not involved in an intra-branch transfer.

Noteworthy of this embodiment is the fact that the loop which is utilized to transfer carriers from one branch to another is passive in the sense that it does not include an air supply.

These and other advantages and objectives of the invention will become more readily apparent from a detailed description thereof taken in connection with the drawings in which:

FIG. 7 is a schematic diagram of a preferred embodiment of a pneumatic carrier branch/loop system incorporating certain further principles of this invention.

Figure 1:
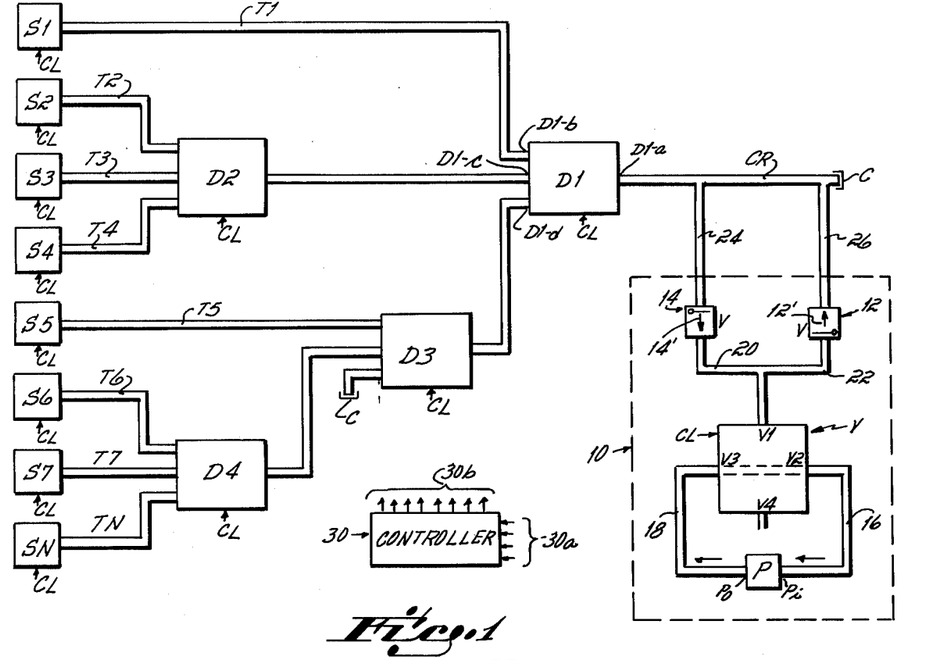
FIG. 1 is a schematic diagram of a preferred embodiment of a pneumatic carrier branch system incorporating certain of the principles of this invention, with the air supply shown in the non-propelling mode.
Figure 4:
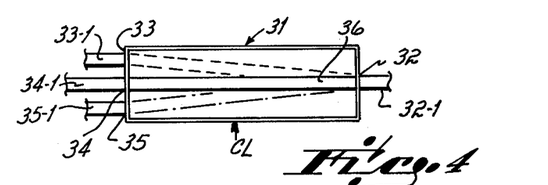
FIG. 4 is a schematic diagram of one preferred form of diverter useful in the systems of this invention for selectively connecting a single carrier transmission tube to one of three different carrier transmission tubes.

The branch system of this invention, a preferred embodiment of which is depicted in FIG. 1, includes a plurality of send/receive stations S1, S2, ... SN, each of which is connected to a single bidirectional carrier transmission tube T1, T2, ... TN, respectively. The number and location of the send/receive stations S1, S2, ... SN depends upon the layout of the building in which the system is installed and the needs of the user. Also included in the branch system is a carrier reversing tube section CR and an associated diverter D1. The diverter D1 has one part D1-a, which is connected to one end of the carrier reversing tube section CR which has its other end capped with a closure C, and at least two, preferably three or more, ports D1-b, D1-c and D1-d, each of which is connected to a station transmission tube, either directly or through, a similar diverter. In the preferred embodiment depicted in FIG. 1, the port D1-b of diverter D1 is connected to transmission tube T1 associated with station S1; port D1-c is connected to one side of a diverter D2 which has three separate output ports connected to station transmission tubes T2, T3 and T4, respectively, associated with stations S2, S3 and S4, respectively; and port D1-d is connected to one side of a diverter D3. The other side of diverter D3 has one of its outputs connected to station transmission tube T5 associated with station S5, another output to stations S6, S7 and SN via a diverter D4 and station tubes T6, T7 and TN, and a third output capped with a closure C. While a diverter may take many forms, it typically includes, as shown in FIG. 4, a housing 31 having on one side thereof a port 32 and on the other side a plurality of ports 33, 34 and 35. While the precise number of ports 33, 34 and 35 can vary depending upon the particular application, there are at least two such ports to facilitate selective delivery of a carrier from port 32 to one or the other of at least two other ports, such as, ports 33, 34 and 35. Ports 32, 33, 34 and 35 are designed to connect to carrier transmitting tubes of the branch, such as tubes 32-1, 33-1, 34-1 and 35-1. Located within the housing 31 is a short length of tube 36 which at its right end, as viewed in FIG. 4, is pivotally connected proximate port 32. The lefthand end of tube 36, as viewed in FIG. 4, is movable on a selective basis for interconnecting port 32 with one or the other of ports 33, 34 or 35. A suitable actuator (not shown), which is responsive to a control signal from a controller 30, to be described, is input to the diverter on line CL, places the pivotal diverter tube 36 in the desired position to facilitate transfer of carriers between tube 32-1 at one side of the diverter housing 31 and a selected one of tubes 33-1, 34-1 or 35-1 located on the other side of the diverter housing. The signal responsive actuator, which places the pivotal diverter tube section 36 in the desired position, may take any suitable form, such as, the combination of an electrical motor, linkage, and limit switches. Since the specific details of the particular diverter structure form no part of the invention further description is considered unnecessary.

The diverters D1, D2, D3 and D4 preferably are identically constructed to simplify manufacture and inventory problems. However, the diverters could be constructed differently. For example, the diverter D3 which has its one port connected to port D1-d of diverter D1 could be provided on its other side with only two ports inasmuch as one of the ports is capped and hence not used. At the very least, each of the diverters D1, D2, D3 and D4 utilizes on one side only a single port and on the other side at least two ports. With such a construction the diverter can selectively transfer a carrier from one tube connected to the single port on one side of the diverter to one of the at least two other tubes connected to the at least two ports on the other side of the diverter.

The carrier propelling air supply, or blower, 10 includes a pump P having an inlet port $P_i$ and outlet port $P_o$, a three-way valve V having ports V1, V2, V3 and V4, any two of which can be selectively connected to each other; and a pair of oppositely connected one-way, or check valves 12 and 14 which permit the flow of air therethrough only in the direction of arrows 12' and 14', respectively. An air hose 16 interconnects pump inlet port $P_i$ and valve port V2. An air hose 18 interconnects pump outlet port $P_o$ and valve port V3. Air hoses 20 and 22 connect the port V1 of the three-way valve V to the outlet port and inlet port of the one-way valves 14 and 12, respectively. Air hoses 24 and 26 connect the inlet and outlet ports of one-way valves 14 and 12 to spaced points of the carrier reversing tube section CR. Valve port V4 connects to atmosphere.

The carrier propelling air supply 10 has three basic modes of operation depending upon the position of the three-way valve V. These modes include a non-propelling mode, a vacuum mode and a pressure mode. In the non-propelling mode the ports V2 and V3 of the three-position valve V are interconnected as shown schematically in FIG. 1. When ports V2 and V3 are so connected, neither vacuum (sub-atmospheric pressure) nor pressure (super-atmospheric pressure) is applied to the carrier reversing tube section CR by the lines 24 and 26, respectively. Under these circumstances, which in operation typically occur after a carrier has exited port D1-a of diverter D1 and entered the carrier reversing tube section CR, the carrier is not propelled in either direction.

Figure 2:
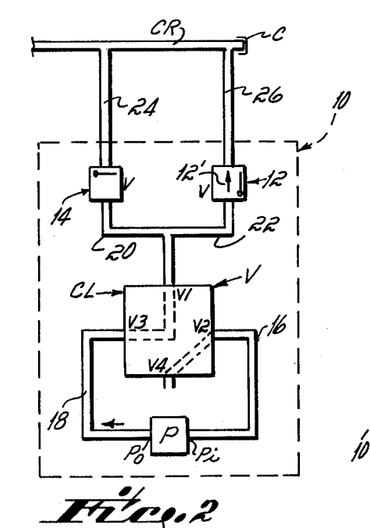
FIG. 2 is a schematic circuit diagram of the air supply of FIG. 1 showing the air supply in the pressure mode.

In the pressure mode, the ports V1 and V3 are interconnected as are ports V2 and V4 (see FIG. 2). With the ports of valve V so connected, super-atmospheric pressure is applied to the carrier reversing tube section CR via line 18, interconnected valve ports V3 and V1, line 22, one-way valve 12 and line 26. When the system is in the pressure mode, which typically occurs during the second segment of an intra-branch transfer as the carrier moves from the reversing tube CR to its destination station, any carrier in the system located leftwardly of the junction of line 26 in carrier reversing tube CR will be propelled away from such junction through the diverter D1 toward its destination.

Figure 3:
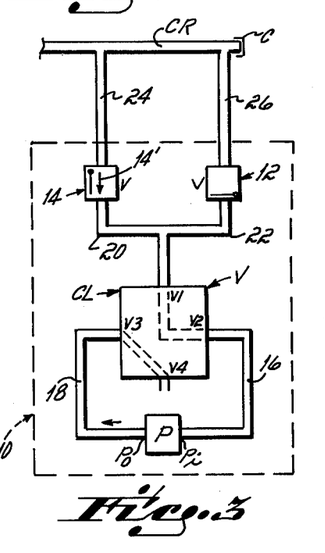
FIG. 3 is a schematic circuit diagram of the air supply of FIG. 1 showing the air supply in the vacuum mode.

In the vacuum mode, valve ports V1 and V2 are interconnected, as are valve ports V3 and V4 (see FIG. 3). With the ports of valve V so connected sub-atmospheric pressure, or vacuum, is applied to the carrier reversing tube section CR via line 16, valve ports V1 and V2, line 20, one-way valve 14, and line 24. With vacuum applied to the carrier reversing tube section, any carrier in the system located leftwardly of the junction of air line 24 and carrier reversing tube section CR will be drawn through diverter D1 toward the carrier reversing tube section CR. This typically occurs during the first segment of an intra-branch transfer in which a carrier is moving from the originating, or sending, station to the carrier reversing tube section CR whereat, when the system is placed in the non-propelling mode, the carrier momentarily comes to rest prior to reversal of direction for transmission to the destination, or receiving, station when the system is placed in its pressure mode.

In operation, an intra-branch carrier transfer occurs, for example, from sending station S-1 to receiving station S-6, in the following manner. Specifically, a carrier is inserted into the sending station S1 along with entry into the system of the destination station, in this example, station S6, to which the carrier is to be transmitted. Destination station entry can be effected via a suitable keyboard or the like provided at sending station S1. Assuming that no other carrier is in transit in the branch, the diverters are set to provide a complete carrier transmission path between sending station S1 and the carrier reversing tube section CR and the system is placed in the vacuum modes. With the foregoing done, the system is prepared to facilitate completion by the carrier of the first segment of the intra-branch transfer, that is, movement of the carrier from station S1 to the carrier reversing tube station CR. Since there is only one diverter D1 between the sending station and the carrier reversing tube section CR, to prepare the system for the first segment of the intra-branch transfer it is only necessary to set diverter D1 such that ports D1-*a* and D1-*b* are interconnected. With this done, and the system in the vacuum mode, when the carrier inserted in the sending station S1 is released, it will be pulled or drawn through tube T1, pass through the diverter D1 via ports D1-*b* and D1-*a*, and enter the carrier reversing tube section CR. Upon arrival of the carrier in the carrier reversing tube section CR, the carrier propelling air supply 10 is placed in its non-propelling mode, causing the carrier to come to rest in the carrier reversing tube section at a point leftwardly of the junction of pressure line 26 and the carrier reversing tube section CR. When the carrier has come to rest in the carrier reversing tube section CR the first segment of the intra-branch transfer is complete.

To effect the second segment of the intra-branch transfer, the diverters located between the carrier reversing tube section CR and the destination station S6, namely, diverters D1, D3 and D4, must be set to complete a carrier transmission path between the carrier reversing tube section CR and the destination station S6. Once this is done, the air supply 10 is placed in the pressure mode and the carrier propelled from the carrier reversing tube section CR, successively through diverters D1, D3 and D4, and ultimately to destination station S6 via its associated station transmission tube T6. Diverters D3 and D4 through which the carrier passes during the second segment of the intra-branch transmission, if desired, can be set during the first segment of the intra-branch transfer.

To facilitate release of the carrier inserted into the sending station, setting of the diverters at the desired points in time during an intra-branch transmission, and changing of the modes of the carrier propelling air supply 10 when necessary, a controller 30 is provided. The controller 30, which may take the form of a special or general purpose computer, hard-wired logic circuitry or the like is responsive on lines 30*a* to a plurality of carrier sensors (not shown) located at strategic points throughout the system which monitor the progress of a carrier through the system and thereby provide inputs to the controller 30 reflecting the location of the carrier at any given point in time. The controller 30 is also provided with a plurality of output lines 30*b* which are connected to control lines CL of the diverters, carrier release mechanisms of the stations and to the three-way valve of the carrier propelling air supply 10, for operating these devices in accordance with the position of the carrier in the system as it moves from the sending sation to the receiving station in the course of an intra-branch transfer.

Since the structure and operation of the station carrier release mechanism, diverters, carrier propelling air supply valves, carrier position sensors, and the controller for sequencing such devices are well-known, further description thereof is unnecessary.

The branch system depicted in FIG. 1 is designed to facilitate the transmission of carriers between any two of the stations S1, S2, . . . SN includes in the branch. Characterizing an intra-branch carrier transmission, i.e., transmission of a carrier from one branch station to another branch station, is the fact that each intra-branch carrier transmission includes a first segment in which the carrier moves away from the sending or originating station through, inter alia, at least one diverter to a carrier reversing tube section associated with the diverter whereat the carrier's motion is arrested and its direction reversed, and a second segment in which the carrier moves from the carrier reversing tube section through the associated diverter, and possibly one or more other diverters, to the destination or receiving station. Thus, each intra-branch carrier transmission includes two carrier motion segments with a carrier direction reversal separating the segments. Also characteristic of intra-branch carrier transfers in the branch system is that the pneumatic tubes used to interconnect the stations, diverters, and carrier reversing tube sections are of the "single tube" type in the sense that carriers move through the tubes in both directions depending upon whether the carrier propelling air supply is in its vacuum mode or pressure mode. Finally, and also characteristic of the branch system of this invention is that there is a single carrier propelling air supply per branch regardless of the number of stations in that branch, which air supply during the first segment of an intra-branch transfer, when a carrier is moving away from the sending station, is in the vacuum mode, and which during the second segment of an intra-branch transfer, when the carrier is moving toward the destination station, is in the pressure mode. When a carrier is at rest or in the reversing tube section of the branch, the branch air supply is in a pressureless, vacuumless, non-propelling mode.

Figure 6:
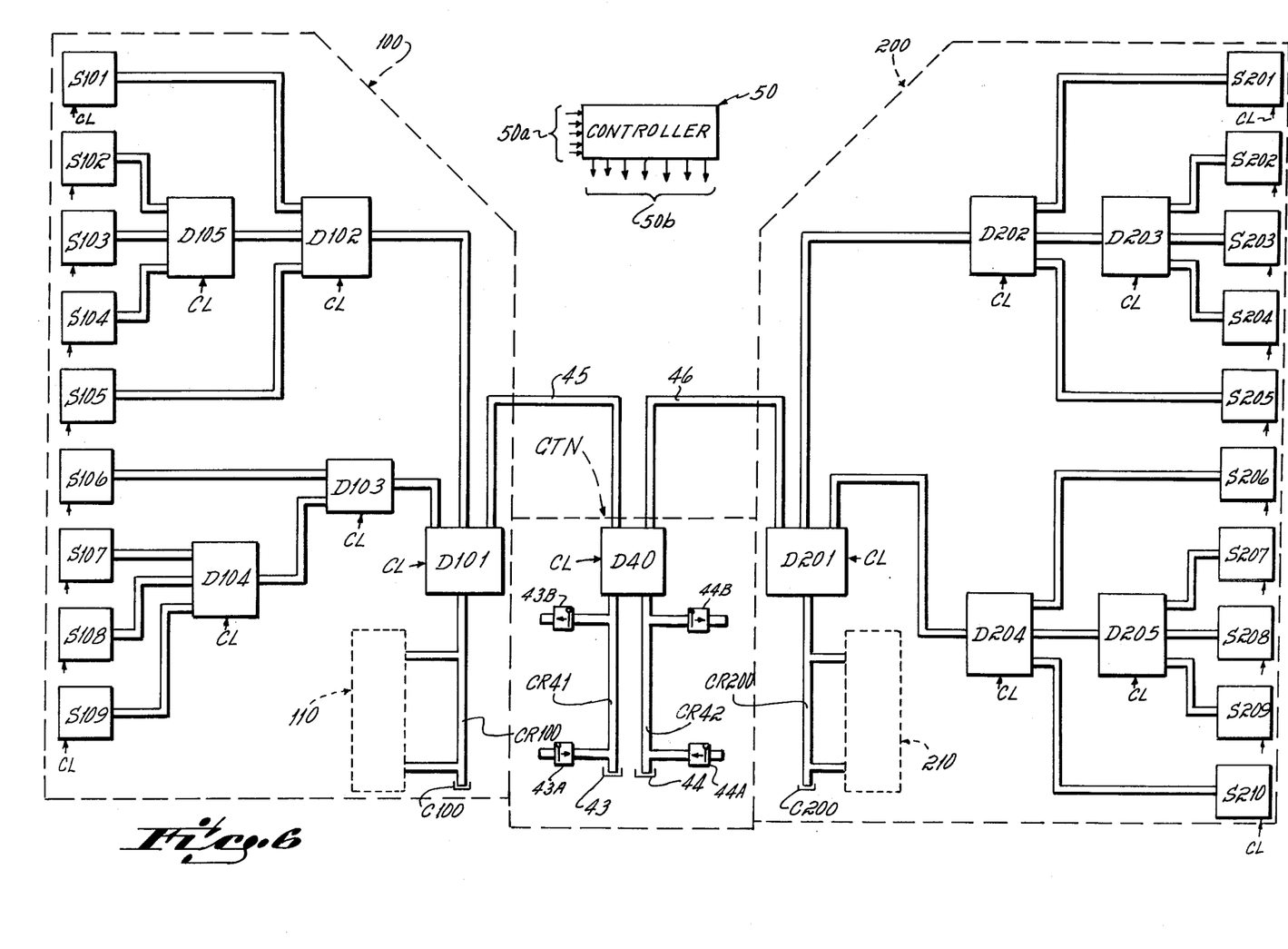
FIG. 6 is a schematic diagram of a preferred embodiment of a double branch pneumatic carrier system incorporating certain additional principles of this invention.

With reference to FIG. 6 a dual branch system is disclosed incorporating the branch concept of the system depicted in FIG. 1, as well as certain additional principles of this invention. The double branch system is seen to include a first branch 100 and a second branch 200 which are interconnected with each other to facilitate inter-branch carrier transfer via a carrier transfer network CTN. Network CTN temporarily stores and reverses the direction of a carrier being transferred between the branches 100 and 200. The configuration and content of each of the branches 100 and 200, as is the case with the single branch depicted in FIG. 1, depends on the layout of the building in which the system is installed and the needs of the user.

In any case, each of the branches 100 and 200 includes a single carrier propelling air supply 110 and 210, respectively, which are identical in structure and operation to the air supply 10 described in connection with FIGS. 1-3. In addition, each of the branches 100 and 200 includes a carrier reversal tube section CR100 and CR200, respectively, across which the air supplies 110 and 210 are respectively connected. Each of the carrier reversal tube sections CR100 and CR200 at one end is closed with a suitable cap C100 and C200 and at the other end is connected to the port of a diverter D101 and D201, respectively. Each of the branches 100 and 200 also includes its respective plurality of stations S101, S102, ... S109 and S201, S202, ... S210, respectively. The stations of each of the branches connect via one or more diverters to one of the ports of the diverter which is associated with the carrier reversing tube. For example, each of the stations S101, S102, ... S109 connects to one of the ports of diverter D101 associated with reversing tube CR100 via one or more of the diverters D102, D103, D104 and/or D105. Similarly, each of the stations S201, S202, ... S210 connects to one of the inputs of the diverter D201 associated with carrier reversing tube section CR200 via one or more of the diverters D202, D203, D204 and/or D205. In this way, and with respect to branch 100, a carrier can be transmitted when the branch air supply 110 is in the vacuum mode, between any one of the stations S101, ... S109 and the carrier reversing tube section CR100. The carrier can then be returned to another one of the stations S101, ... S109 by placing air supply 110 in the pressure mode and setting the diverters D101 through D105 as is necessary to complete a path between carrier reversing section CR100 and the desired receiving station S101, ... S109 thereby completing an intra-branch transfer.

Similarly, each of the stations S201, ... S210 of branch 200 is connected to one of the ports of the diverter D201 associated with carrier reversing tube section CR200 via one or more of the diverters D202, D203, D204 and/or D205. In this way a carrier path can be completed between any one of the stations S201 through S210 and the carrier reversing tube section CR200. Specifically, by placing the air supply 210 in the vacuum mode and appropriately setting the diverters D201 through D205 a carrier can be transmitted from any one of the stations S201 through S210 to the carrier reversing section CR200. By then placing the air supply 210 in the pressure mode and appropriately setting the diverters D201 through D205 a carrier located in the carrier reversing tube section CR200 can be selectively transmitted to any one of the stations S201 through S210 of branch 200, thereby completing an intra-branch transfer.

With respect to an intra-branch transfer, whether it be from one of the stations S101, ... S109 of branch 100 to another station in that branch, or from one of the stations S200 through S210 of branch 200 to another station in that branch, an intra-branch carrier transfer in the dual branch system depicted in FIG. 6 operates in precisely the same manner as in intra-branch transfer operates in the branch depicted in FIG. 1. Specifically, to transfer a carrier in branch 100 from station S101 to station S107, the air supply 110 is placed in its vacuum mode and the diverters D102 and D101 appropriately set to complete a carrier path between sending station S101 and carrier reversing section CR100 of branch 100. With branch 100 in the vacuum mode and the diverters D102 and D101 set, a carrier inserted in sending station S101 will complete the first segment of an intra-branch transfer by moving from the sending station S101 to the carrier reversal section CR100 via diverters D102 and D101. Once the carrier arrives at the carrier reversing section CR100 the air supply 110 is momentarily placed in its non-propelling mode and the carrier comes to rest. The air supply 110 is then placed in its pressure mode and the diverters of branch 100 set to complete a path between reversing tube section CR100 and the desired destination or receiving station. For example, if it is desired to send the carrier to station S107, diverters D101, D103 and D104 will be appropriately set to complete a path between carrier reversal section CR100 and destination station S107. With this done and the air supply 110 in the pressure mode the carrier which has been transmitted during the first segment from station S101 to the carrier reversing section CR100 will be successively propelled through diverters D101, D103 and D104 to the desired destination station S107.

In analogous fashion, an intra-branch carrier transfer can be effected in branch 200. For example, if it is desired to send a carrier from station S201 to station S210 the diverters D202 and D201 are set to facilitate movement of the carrier from station S201 to the carrier reversing tube section CR200 via diverters D202 and D201 when the system is placed in its vacuum mode. Upon completion of the first segment of the trip with the carrier in the carrier reversing section CR200, the air supply 210 is placed momentarily in its non-propelling mode and the carrier stops. The diverters D201 and D204 are then appropriately set and the air supply 210 placed in its pressure mode to propel the carrier from the carrier reversal tube section CR200 successively through diverters D201 and D204 to the desired destination station S210.

Since each branch 100 and 200 has its own carrier reversing section, air supply and associated diverter (CR100, 110 and D101 for branch 100; and CR200, 210 and D201 for branch 200), an intra-branch transfer in branch 100 may be effected simultaneously with an intra-branch transfer in branch 200. Thus, the previously described intra-branch transfers from station S101 to station S107 of branch 100 and from station S2-1 to station S210 of branch 200 can occur concurrently.

To facilitate an inter-branch transfer, that is, a transfer of a carrier from a station in one of the branches 100 or 200 to a station in the other branch, the carrier transfer network CTN is utilized. This network includes a diverter D40 of the type shown in detail in FIG. 5 discussed hereafter. The carrier transfer network CTN also includes a pair of carrier reversing tube sections CR41 and CR42 connected to different ports associated with one side of the diverter 40. Each of the carrier reversing tube sections CR41 and CR42 has its remote end capped with a cap 43 and 44, respectively. Intermediate the ends of reversing tube sections CR41 and CR42 are pairs of oppositely directed one-way valves 43A, 43B and 44A, 44B, respectively. The diverter D40 of the carrier transfer network CTN has on the side opposite the ports to which the carrier reversing tubes CR41 and CR42 are connected, two additional ports which connect via lines 45 and 46 to ports of the diverters D101 and D201 of branches 100 and 200 which are associated with the carrier reversing tube section CR100 and CR200, respectively.

Figure 5:
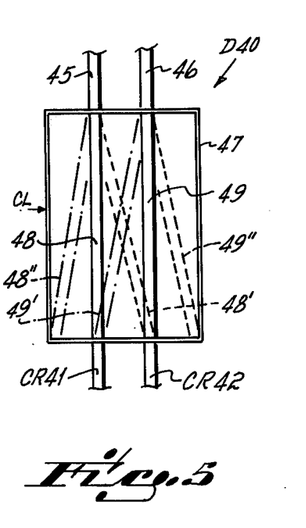
FIG. 5 is a schematic diagram of another preferred form of diverter useful in the systems of this invention for selectively connecting any one of a first pair of carrier transmission tubes to any one of a second pair of carrier transmission tubes.

The structure of the diverter D40, considered in more detail in connection with FIG. 5, includes an enclosed box-like housing 47. On the bottom side of the housing 47, as viewed in FIG. 5, two ports are provided which are respectively connected to carrier reversing tube sections, such as carrier reversing tube sections 41 and 42 of the carrier transfer network CTN depicted in FIG. 6. On the other, or top end of the housing, as viewed in FIG. 5, the diverter 47 is provided with separate ports which are connected to carrier tubes associated with different branches, such as tubes 45 and 46 associated with branches 100 and 200 depicted in FIG. 6.

Located inside the housing are a pair of pivotal tube sections 48 and 49, each of which pivots on a selected basis to any one of three positions. Specifically, pivotal tube section 48 can be placed in its solid line position interconnecting tube 45 and carrier reversal tube sections CR41. Alternatively, pivotal tube section 48 can be pivoted to its dotted line position 48' in which carrier tube 45 is connected to carrier reversing tube section CR42, or pivoted to its dot/dash line position 48" in which tube section 45 does not connect to either of the carrier reversing tube sections CR41 or CR42. Similarly, diverter tube section 49 can pivot between any one of three selected position. In a first position shown in solid lines FIG. 5, diverter tube section 49 interconnects carrier tube 46 and carrier reversing tube section CR42. In the dot/dash line position 49' of diverter tube section 49, carrier tube line 46 is connected to carrier reversing tube section CR41. Finally, in the dotted line position 49' of diverter tube section 49 carrier tube 46 is not connected to either of the pair of carrier reversing tube sections CR41 or CR42.

By virtue of the structure and operation of the diverter D40, which is depicted in greater detail in FIG. 5, carriers leaving branch 100 in tube 45 can be transferred to tube 46 for transmission to branch 200. Alternatively, a carrier leaving branch 200 on line 46 can be delivered to branch 100 via line 45.

To effect an inter-branch transfer, for example, from station S101 in branch 100 to station S201 in branch 200 the following procedure is employed. Specifically, a carrier is inserted into sending station S101 of branch 100, the diverter D102 and D101 are set to complete a carrier transmission path between station S101 and carrier reversing tube section CR100, and the air supply 110 placed in its vacuum mode. With these conditions met, a carrier inserted into sending station S101 will successively pass through diverters D102 and D101 into the carrier reversing section CR100. Upon arrival of the carrier in carrier reversing section CR100 the air supply 110 is placed in its non-propelling mode and the carrier motion momentarily arrested.

The diverter D101 is then set to complete a path between carrier reversing tube section CR100 and branch tube 45. In addition, the diverter D40 is set to complete a path between carrier branch tube 45 and carrier reversing section CR41. With the diverters D101 and D40 so set, a carrier transmission path is completed between the carrier reversing sections CR100 and CR41 via diverters D101 and D40. The air supply 110 of the sending branch 100 is placed in its pressure mode and the carrier located in the carrier reversal section CR100 of branch 100, which originated at station S101, is propelled successively through diverter D101, branch tube 45 and diverter D40 into carrier reversing section CR41 of the carrier transfer network CTN. Upon reaching the carrier reversing section CR41 of the carrier transfer network D40 the carrier motion is arrested and air supply 110 is placed in the non-propelling mode.

The diverter D40 is now set to complete a carrier transmission path between carrier reversing tube section CR41 in which the carrier now is located and branch tube 46 which connects the carrier transfer network D40 to the branch 200. In addition, the diverter D201 of branch 200 is set to complete a path between branch tube 46 and carrier reversing section CR200 associated with diverter D201. With diverters D40 and D201 so set, the air supply D210 is placed in its vacuum mode and the carrier residing in carrier reversal section CR41 successively passes through diverter D40, branch tube 46 and diverter D201 into the carrier reversing section CR200 of branch 200. Upon arrival of the carrier in carrier reversing section CR200, the air supply 210 is placed in its non-propelling mode and the carrier motion arrested.

The diverters D201 and D202 are now set to complete a carrier transmission path between carrier reversing section CR200, whereat the carrier now resides, and the destination or receiving station S201. With these diverters properly set the air supply 210 is placed in its pressure mode and the carrier residing in carrier reversal section CR200 is propelled successively through diverter D201 and diverter D202 to the station S201 via the carrier transmission tube interconnecting diverter D201 and D202 and the carrier transmission tube interconnecting diverter D202 and station S201. The inter-branch transfer from station S101 to station S201 is now complete.

A controller 50 is provided to effect setting of the diverters of the branch 100 and the branch 200 as well as of the inter-branch carrier transfer network CTN, and placement of the air supplies 110 and 210 of the two branches in the desired modes, at the correct time in the course of transmission of a carrier from one station to another, whether within the same branch or to a different branch. The controller 50 has a plurality of inputs 50a which are responsive to carrier sensors (not shown) located throughout the double branch pneumatic tube system. The controller 50 is also provided with a plurality of outputs 50b which provide control signals to the diverters and air supplies of the dual branch system on their respective control lines CL. The control signals, in the manner described in connection with the single branch system of FIG. 1, set the diverters and activate the air supplies in their various modes at the appropriate time in the course of transmission of the carrier, whether the transmission be intra-branch or inter-branch.

In the foregoing description in which an inter-branch transfer occurred between station S101 of branch 100 and station S201 of branch 200, it was assumed that upon arrival of the carrier from sending station S101 in carrier reversing section CR41 of the carrier transfer network CTN, that destination branch 200 was inactive, that is, that an intra-branch transmission was not underway in branch 200. Had an intra-branch transmission been underway in destination branch 200 upon arrival of the carrier from station S101 in branch 100 at the carrier reversing section CR41 of the carrier transfer network CTN, the carrier would have remained in storage in carrier reversing section CR41 until such time as the intra-branch transfer in destination branch 200 was complete. As soon as the intra-branch transfer in branch 200 is complete, had there been such, the controller 50 would have set the appropriate diverters and activated the appropriate air supplies to transfer the carrier which had been stored in carrier reversing section CR41 of the carrier transfer network CTN to the desired destination station S201 in branch 200.

Thus, in an inter-branch transfer if the sending branch whereat the transmission is originating is available, i.e., there is no carrier in transit in that branch, transmission of the carrier from a station within that branch can be initiated and the carrier stored in the carrier transfer network CTN notwithstanding that at the time of initiation of the transmission from the sending station there is underway an intra-branch transfer in the destination branch containing the destination station. However, until such time as the intra-branch transmission in the branch containing the destination station is complete, the carrier stored in the carrier transfer network CTN cannot be delivered to its destination station. Hence, not only does the dual branch system of FIG. 6 permit different intra-branch transfers to occur simultaneously, but it permits the initiation (but not completion) of an inter-branch transfer while an intra-branch transfer is underway in the branch containing the destination station involved in the inter-branch transfer.

By virtue of utilizing the diverter D40 in the dual branch system depicted in FIG. 6, which diverter can simultaneously connect branch 100 to carrier reversing tube CR41 via tube 45 and connect branch 200 to carrier reversing tube CR42 via branch tube 46, carriers can simultaneously transfer from stations in branches 100 and 200 to carrier reversing tubes CR41 and CR42, respectively. In addition, carriers can simultaneously be transmitted from reversing tube sections CR41 and CR42 to branches 200 and 100 via branch tubes 46 and 45, respectively. Thus, it is possible to initiate two inter-branch transfers at the same time by simultaneously transferring carriers from branches 100 and 200 to carrier reversing tubes CR41 and CR42. However, completion of the two inter-branch transfers cannot occur simultaneously, but rather must occur sequentially. Similarly, it is possible to complete two inter-branch transfers at the same time by simultaneously transferring carriers to branches 100 and 200 from carrier reversing tubes CR41 and CR42. However, initiation of the two inter-branch transfers cannot occur simultaneously, but rather must occur sequentially.

If desired only a single carrier reversing tube, such as carrier reversing tube CR41 or CR42, can be associated with the diverter D40 of the carrier transfer network CTN. Were only a single carrier reversing tube to be associated with network diverter D40 inter-branch transfers could still occur. However, two inter-branch transfers could not be simultaneously initiated or completed since there would be only one carrier reversing tube associated with the diverter to which a carrier could be transferred from a sending branch prior to transmission to the receiving branch.

Incorporating the branch depicted in FIG. 1, but in a considerably more complex and powerful system, is the branch/loop system shown in FIG. 7. The system shown in FIG. 7 includes a closed carrier transmission loop 400 connected to a plurality of branches 500, 600, 700 and 800 of the type described in connection with FIG. 1. The branch/loop system is capable of simultaneous multiple intra-branch transfers. In addition, the branch/loop system 400 is capable of inter-branch transfers, and in certain instances can effect simultaneously multiple inter-branch transfers, all in a manner to be described.

The branches 500, 600, 700 and 800 are identical to the branch depicted in FIG. 1 insofar as basic structural and operational principles are concerned. Thus, each of the branches includes multiple stations which are capable of both transmitting and receiving, at least one carrier reversing section which has associated with it an air supply capable of vacuum, pressure and non-propelling modes, and a diverter of the type shown in FIG. 4 which interconnects the carrier reversing section and the multiple sending/receiving stations, either directly or through additional diverters. For example, branch 600 includes a carrier reversing section CR600 which at one end is connected to a diverter D601 of the type shown in FIG. 4 and at the other end is closed with a cap C600. An air supply 610 identical in construction to the air supply 10 shown in the branch system of FIG. 1 is connected to the carrier reversing tube section CR600 to place the branch 600 selectively in the pressure, vacuum or non-propelling mode. The branch 600 includes a plurality of sending/receiving stations S601, . . . S606 which are connected via station lines T601, . . . T606 to diverters D602 and D603. The diverters D602 and D603 in turn connect to the diverter D601 via lines 605 and 607. The diverters D602 and D603, like the diverters D601, are constructed in accordance with the description provided in connection with the diverter shown in FIG. 4.

An intra-branch transfer in branch 600, for example, from station S601 to station S606, is effected in the same manner as intra-branch transfers are effected in the branch of FIG. 1 and the branches 100 and 200 of FIG. 6. For example, to transfer a carrier from station S601 to station S606, both stations being within the same branch 600, the diverters D601 and D602 are set to complete a carrier transmission path between sending station S601 and the carrier reversing tube section CR600. The air supply 610 is then placed in the vacuum mode and the carrier inserted into station S601 is drawn successively through station line T601, diverter D602, line 605, diverter D601 into the carrier reversing section 600, whereupon the air supply 610 is momentarily placed in its non-propelling mode. The diverter D601 and D603 are then placed to complete a carrier path between carrier reversing section CR600 and the destination section S606. When the diverters have been so set the air supply 610 is placed in the pressure mode and the carrier which originated in sending station S601 and which is now located in carrier reversing tube section 600 is propelled successively through diverter 601, carrier tube 607, diverter 603, station tube T606 to the receiving station S606. Since each of the branches 500, 600, 700 and 800 have their own carrier reversing tube sections CR500, CR600, CR700 and CR800 and associated air supplies 510, 610, 710 and 810, and diverters D501, D601, D701 and D801, intra-branch transfers within the branches 500, 600, 700 and 800 can occur simultaneously within each of these respective branches. Thus, an intra-branch transfer of a carrier from station S601 to S606 in branch 600 can occur simultaneously with an intra-branch transfer of a carrier from station S501 to station S506 in branch 500, etc.

The loop 400 includes diverters D401, D402, D403, and D404, each of which are constructed in accordance with the principles described in connection with FIG. 5. Interconnecting the diverters D401, D402, D403 and D404 are carrier tubes 405, 406, 407 and 408. When the diverters D401, D402, D403 and D404 connect lines 405 and 408, lines 408 and 407, lines 407 and 406, and lines 406 and 405, respectively, a closed carrier transmitting loop exists through lines 405, 406, 407, 408 and diverters D401, D402, D403 and D404. Each of the diverters D401, D402, D403 and D404 in the loop 400 has associated with it a carrier reversing section CR410, CR411, CR412 and CR413, respectively. Each of the carrier reversing tube sections CR410, CR411, CR412 and CR413, in addition to being connected to one port of its respectively associated diverter D401, D402, D403 and D404 is also provided at its other end with a closure or cap 414. Although not shown in FIG. 7, each carrier reversing tube section CR410, CR411, CR412 and CR413 has connected to it a pair of oppositely directed one-way valves. Finally, each of the diverters D401, D402, D403 and D404 have associated with them a branch tube 415, 416, 417 and 418 connecting the respective diverters to the diverter D501, D601, D701 and D801 of the associated branches 500, 600, 700, and 800. The diverters D401, carrier reversing tube section CR410, cap 414, and branch tube 415 collectively constitute a branch/loop carrier transfer network 420 for facilitating transfer of carriers between the loop 400 and the branch 500. Branch/loop carrier transfer networks 421, 422 and 423, each of which contain elements analogous to those of branch/loop carrier transfer network 420, facilitate transfer of carriers between branch 400 and associated branches 600, 700 and 800.

An inter-branch transfer, for example, from station S701 in branch 700 to station S606 in branch 600, is accomplished in the following manner. Specifically, the diverters D702 and D701 of branch 700 are set to complete a carrier transmission path from sending station S701 to the carrier reversing tube section CR700. When this has been done the air supply 710 is placed in the vacuum mode and the carrier inserted into the sending station S701 is drawn successively through its associated station line T701, diverter D702, line 705 and diverter D701 into the carrier reversing tube section CR700. Upon arrival of the carrier in carrier reversing section CR700 the air supply 710 is placed in its non-propelling mode. The diverter D403 connected in the loop 400 is then set to complete a path between branch tube 417 and carrier reversing tube section CR412 in the branch/loop carrier transfer network 422. The diverter D701 is also set to complete a carrier transmission path between carrier reversing tube section CR700 whereat the carrier is located and branch tube 417. With diverters D701 and D403 set in this manner, the branch air supply 710 is placed in its pressure mode to transfer the carrier from reversing tube section CR700 successively through diverter D701, branch tube 417, diverter D403 into the carrier reversing tube section CR412 of the branch/loop carrier transfer network 422.

The carrier remains stored in carrier reversing tube section CR412 until the loop section 407, which interconnects the branch/loop carrier transfer networks 421 and 422 associated with the branches 600 and 700 between which the carrier is being sent, becomes available. When loop section 407 is available, that is, when a carrier is not located therein, the diverter D403, which is associated with reversing tube CR412 storing the carrier, is switched to complete a path between carrier reversing tube section CR412 whereat the carrier is located and loop tube section 407 to facilitate transfer of the stored carrier to the loop section 407. Similarly, diverter D402 is set to complete a carrier transfer path between loop section 407 and branch tube section 416 associated with the receiving branch 600 to facilitate transfer of the carrier from loop tube section 407 to branch tube section 416 of the receiving branch 600. In addition, diverter D601 is set to complete a path between branch tube 416 and the carrier reversing tube section CR600 of the receiving branch. With diverters D403, D402 and D601 set in the manner indicated, the air supply 610 of the receiving branch 600 is placed in its vacuum mode and the carrier, which is now temporarily stored in the carrier reversing tube section CR412 of branch/loop carrier transfer network 422, is drawn into the carrier reversing tube section CR600 of the destination branch 600 via diverter D403, loop section 407, diverter D402, destination branch tube 416 and diverter D601. As soon as the carrier enters in the branch tube 416 associated with the destination branch 600 the diverters D403 and D402 are reset to complete carrier transmission paths between loop sections 406 and 407, and loop sections 407 and 408, thereby returning the loop 400 to its closed path condition.

Upon arrival of the carrier in the carrier reversing tube section CR600 of destination branch 600, the air supply 610 is switched from its vacuum mode to its non-propelling mode. The diverter D601 is then set to complete a carrier transmission path between carrier reversing tube section CR600 and tube section 607. In addition, diverter D603 is set to complete a carrier transfer path between tube 607 and destination station S606. When diverted D601 and D603 have been set in the manner indicated, the air supply 610 of the destination branch is placed in its pressure mode and the carrier which is now located in carrier reversing tube section CR600 of the destination branch is propelled successively through diverter D601, tube section 607, diverter 603 and station tube T606 to the destination station S606. This completes transmission of a carrier from station S701 in branch 700 to station S606 in branch 600.

In the course of an inter-branch transfer, for example, between stations in branches 700 and 600, the carrier reverses its direction and is temporarily stored in a carrier reversing tube section on three separate occasions, namely, those carrier reversal and storage operations which occurred in carrier reversing tube sections CR700 of the transmitting branch, CR412 of the branch/loop carrier transfer network 402, and carrier reversing tube section CR600 of the destination branch 600.

Significantly, in the foregoing example in which a carrier was transmitted from station S701 of branch 700 to station S606 of branch 600, during the period of time when the carrier was being transferred from branch 700 to carrier reversing tube section CR412 of branch/loop carrier transfer network 422, a carrier transfer path exists between loop sections 406 and 407 through the diverter D403. As a consequence, during this period when the carrier is being transferred out of branch 700 to the carrier reversing tube section CR412 loop lines 406 and 407 are connected to facilitate transfer of another carrier through sections 416 and 417 of the loop, for example, from a station in branch 800 to a station in either branches 500 or 600. Once the carrier being sent from station S701 in branch 700 to station S606 in branch 600 has arrived in branch tube section 416 and the diverters D403 and D402 are reset to complete paths between loop sections 406 and 407 and loop sections 407 and 408, loop sections 406, 407 and 408 can be used to effect the transfer of carriers between stations 500, 700 and 800 concurrently with the transfer within branch 600 of the carrier from the carrier reversing tube section CR600 to the destination station S606.

To effect switching of the various diverters of the branches 500, 600, 700 and 800 and of the branch/loop carrier transfer network 420, 421, 422 and 423 and mode switching of the air supplies of the various branches and branch/loop carrier transfer networks, a controller 70 is provided. The controller 70 has a plurality of inputs 70a which are responsive to carrier sensors (not shown) located throughout the system for providing the controller with information with respect to the location of all carriers in the system. In addition, the controller 70 is provided with a plurality of lines 70b which provide control signals to the control line CL of all system air supplies and diverters. In this manner, the controller 70 switches the system diverters and air supplies in proper sequence to effect intrabranch transfers (simultaneous or sequential), as well as inter-branch transfers (simultaneous or sequential).

Finally, as is apparent from the foregoing, in the system of FIG. 7 inter-branch transfers can occur simultaneously. For example, a carrier can be in the process of transfer from a station in branch 700 to a station in branch 600 simultaneously with the transfer of a carrier from a station in branch 500 to a station in branch 800. The transfer of a carrier from branch 700 to branch 600 uses branch/loop carrier transfer networks 422 and 421 as well as interconnecting loop tube section 407. Similarly, transfer of a carrier from branch 500 to branch 800 uses branch/loop carrier transfer networks 420 and 423 as well as interconnecting loop tube section 405. Since the branch/loop carrier transfer networks and loop tube section utilized in connection with the transfer of a carrier from branch 700 to branch 600 is different than that for the carrier transfer between branches 500 and 800, the two inter-branch transfers can use the loop 400 simultaneously, albeit different loop tube sections and diverters thereof, thereby permitting simultaneous inter-branch transfers to occur.

Having described the invention, what is claimed is:

1. A pneumatic tube system for conveying carriers, comprising:
    two carrier-conveying pneumatic tube branches, each branch including:
        a. at least two stations and a branch tube,
        b. a carrier reversing tube closed at one end,
        c. a diverter having separate ports individually connected to said branch tube, different ones of said stations, and to said carrier reversing tube for selectively completing carrier-conveying paths between (1) said stations and branch tube and (2) said carrier reversing tube,
        d. only one air supply connected to said carrier reversing tube to alternatively and selectively transfer carriers into and out of said carrier reversing tube via said diverter,
    an inter-branch carrier transfer network including:
        a. at least one carrier reversing tube closed at one end,
        b. a diverter connected between said carrier reversing tube and said branch tubes for selectively connected said branch tubes to said carrier reversing tube, and
    said inter-branch carrier transfer network having no air supply associated with it except for said branch air supplies,
    a controller for operating said branch and network diverters and said branch air supplies to sequentially draw a carrier from a sending station in a sending branch into the carrier reversing tube of said sending branch via said sending branch diverter using said sending branch air supply, thence propel said carrier into said carrier reversing tube of said inter-branch carrier transfer network via said diverter and branch tube of said sending branch and said diverter of said inter-branch carrier transfer network using said sending branch air supply, and thereafter draw said carrier from said network carrier reversing tube to a destination station in said destination branch via said diverter of said inter-branch carrier transfer network, said branch tube and diverter of said destination branch using said destination branch air supply.

2. The system of claim 1 wherein said network includes at least two carrier reversing tubes each selectively connectable to each of said branch tubes to facilitate simultaneous transfers of carriers between said carrier reversing tubes and branch tubes via said diverter using both said branch air supplies.

3. A method of transferring a carrier from a sending station in a multi-station sending branch to a receiving station in a multi-station receiving branch, comprising:
    setting a first diverter, which interconnects a) the open end of a first carrier reversing tube sealed at its other end and b) a sending branch tube and multiple station tubes each connected to different sending stations, to connect only the station tube of a predetermined sending station to the first carrier reversing tube, the first diverter and first carrier reversing tubes being in said sending branch,
    applying sub-atmospheric pressure to said first carrier reversing tube from a first air supply connected thereto to pull a carrier from said predetermined sending station to said first carrier reversing tube via said first diverter and said sending station tube associated with said predetermined sending station,
    setting the first diverter to connect the first carrier reversing tube to the sending branch tube, which sending branch tube at its other end is connected to a second diverter,
    setting the second diverter to connect the sending branch tube to a second carrier reversing tube via the second diverter, applying super-atmospheric pressure to said first carrier reversing tube from said first air supply to push the carrier from the first carrier reversing tube into the second carrier reversing tube via the first diverter, the sending branch tube, and the second diverter, setting the second diverter to connect the second carrier reversing tube to a receiving branch tube, the receiving branch tube being connected between the second diverter and a third diverter in the receiving branch, setting the third diverter to connect the receiving branch tube to a third carrier reversing tube via the third diverter, applying sub-atmospheric pressure to the third carrier reversing tube from a second air supply connected thereto to pull the carrier from the second carrier reversing tube to the third carrier reversing tube via the second diverter, receiving branch tube and third diverter, setting the third diverter to connect the third carrier reversing tube to the station tube of a predetermined receiving station, and applying super-atmospheric pressure to the third carrier reversing tube from the second air supply to push the carrier to said predetermined receiving station via the third diverter and receiving station tube associated with said predetermined receiving station.

4. A pneumatic tube system for conveying carriers, comprising:
  at least three carrier-conveying pneumatic tube branches, each branch including:
    a. at least two stations and a branch tube,
    b. a carrier reversing tube closed at one end,
    c. a diverter having separate ports individually connected to said branch tube, different ones of said stations, and to the other end of said carrier reversing tube for selectively completing carrier conveying paths between 1) said stations and branch tube and 2) said carrier reversing tube,
    d. an air supply connected to said carrier reversing tube to alternatively and selectively transfer carriers to and from said carrier reversing tube via said diverter,
  a pneumatic carrier conveying loop including at least three carrier-conveying loop tube sections connected in series,
  at least three branch/loop carrier transfer networks associated, respectively, with different ones of said branches, each transfer network including:
    a. a carrier reversing tube closed at one end,
    b. a diverter having separate ports individually connected to the other end of said carrier reversing tube, said branch tube of said associated branch, and two of said loop tube sections, said network diverter in cooperation with said air supply of said associated branch being operative to selectively propel (1) carriers from said associated branch tube into said network carrier reversing tube via said network diverter; said network diverter in cooperation with the air supply of a nonassociated branch being operative to draw, (2) carriers from said network carrier reversing tube section to one of said two loop tube sections via said network diverter, and (3) said network diverter being operative in combination with said air supply of said associated branch to draw carriers from the other of said two loop tube sections to said associated branch tube, and
  a controller for sequentially switching said diverters and said air supplies to transfer carriers between two of said three branches via said respectively associated branch/loop carrier transfer networks and branch and loop tubes.

5. The system of claim 4 wherein there are at least four carrier-conveying pneumatic tube branches, loop tube sections and branch/loop transfer networks to facilitate simultaneous inter-branch carrier transfers between different adjacent pairs of branches on said loop; and wherein each said diverter of said branch-/loop networks completes a carrier path between its said two associated loop tube sections when a carrier path is complete between said associated branch tube and said network carrier reversing tube for facilitating transmission of a first carrier in said loop simultaneously with transmission of a second carrier from said branch to said network carrier reversing tube.

6. A method of transferring a carrier from a sending station in a multi-station branch to a receiving station in a multi-station branch, comprising:
  setting a first diverter, which interconnects (a) the open end of a first carrier reversing tube sealed at its other end and (b) a sending branch tube and multiple station tubes each connected to different sending stations, to connect only the station tube of a predetermined sending station to the first carrier reversing tube, the first diverter and first carrier reversing tubes being in said sending branch,
  applying sub-atmospheric pressure to said first carrier reversing tube from a first air supply connected thereto to pull a carrier from said predetermined sending station to said first carrier reversing tube via said first diverter and said predetermined sending station tube,
  setting the first diverter to connect the first carrier reversing tube to the sending branch tube, which sending branch tube at its other end is connected to a second diverter associated with the sending branch,
  setting the second diverter to connect the sending branch tube to a second carrier reversing tube via the second diverter,
  applying super-atmospheric pressure to said first carrier reversing tube from said first air supply to push the carrier from the first carrier reversing tube into the second carrier reversing tube via the first diverter, the sending branch tube, and the second diverter,
  setting the second diverter to connect the second carrier reversing tube to a first loop tube section of a continuous loop, the first loop tube section being connected between the second diverter and a third diverter associated with the receiving branch,
  setting the third diverter to connect the first loop tube section to a receiving branch tube associated with the receiving branch via the third diverter, the receiving branch tube being connected to a fourth diverter,
  setting the fourth diverter to connect the receiving branch tube to a third carrier reversing tube via the fourth diverter,
  applying sub-atmospheric pressure to the third carrier reversing tube from a second air supply connected thereto to pull the carrier from the second carrier reversing tube to the third carrier reversing tube via the second diverter, first loop tube section, third diverter, receiving branch tube and fourth diverter, setting the fourth diverter to connect the third carrier reversing tube to the station tube of the receiving station, and applying super-atmospheric pressure to the third carrier reversing tube from the second air supply to push the carrier to the receiving station via the fourth diverter and receiving station tube.

* * * * *

UNITED STATES PATENT AND TRADEMARK OFFICE
CERTIFICATE OF CORRECTION

PATENT NO. : 4,058,274
DATED : November 15, 1977
INVENTOR(S) : Ernest Hochradel et al.

It is certified that error appears in the above-identified patent and that said Letters Patent are hereby corrected as shown below:

Page 1, after section [76] Inventors:

Add:   --[73] Assignee:  The Mosler Safe Company, Hamilton, Ohio--

In the Abstract:  Add Paragraph 3:

--In another form of the invention, inter-branch transfers are effected using a closed loop having discrete loop tube sections interconnected by diverters, with each diverter connected to the branch tube of a different branch and having its own carrier reversing tube section.--

| Location | Original | Correction |
|---|---|---|
| Col. 1 Line 15 | "multi-branch" | should be --multi-station-- |
| Line 16 | "station" | should be --branch-- |
| Col. 3 Line 41 | "part" | should be --port-- |
| Col. 6 Line 41 | "includes" | should be --included-- |
| Col. 8 Line 65 | "S2-1" | should be --S201-- |
| Col. 16 Line 16 | "connected" | should be --connecting-- |

Signed and Sealed this

Fourteenth Day of November 1978

[SEAL]

Attest:

RUTH C. MASON
Attesting Officer

DONALD W. BANNER
Commissioner of Patents and Trademarks